(12) United States Patent
Cereda et al.

(10) Patent No.: US 10,766,218 B2
(45) Date of Patent: Sep. 8, 2020

(54) PROCESS FOR MANUFACTURING A TYPE AND TYRE BEAD STRUCTURE

(71) Applicant: PIRELLI TYRE S.p.A., Milan (IT)

(72) Inventors: Giuseppe Cereda, Milan (IT); Luca Merlo, Milan (IT)

(73) Assignee: PIRELLI TYRE S.p.A., Milan (IT)

(*) Notice: Subject to any disclaimer, the term of this patent is extended or adjusted under 35 U.S.C. 154(b) by 171 days.

(21) Appl. No.: 14/020,282

(22) Filed: Sep. 6, 2013

(65) Prior Publication Data
US 2014/0000791 A1 Jan. 2, 2014

Related U.S. Application Data

(63) Continuation of application No. 12/311,825, filed as application No. PCT/EP2006/009964 on Oct. 16, 2006, now abandoned.

(51) Int. Cl.
*B29D 30/48* (2006.01)
*B60C 15/04* (2006.01)

(52) U.S. Cl.
CPC .............. *B29D 30/48* (2013.01); *B60C 15/04* (2013.01); *B29D 2030/483* (2013.01); *B60C 2015/044* (2013.01)

(58) Field of Classification Search
CPC .... B29D 30/0005; B29D 30/48; B29D 30/50; B29D 2030/483; B29D 2030/486; B60C 2015/044
See application file for complete search history.

(56) References Cited

U.S. PATENT DOCUMENTS 1,395,036 A * 10/1921 Burns ................ B29D 30/48
118/107
1,503,883 A * 8/1924 Cobb ..................... B60C 15/04
152/540
(Continued)

FOREIGN PATENT DOCUMENTS

BR 0004118 4/2001
EP 0 492 504 A1 7/1992
(Continued)

OTHER PUBLICATIONS

English language translation of IT 151359 (original document dated Feb. 1982).*
(Continued)

*Primary Examiner* — Geoffrey L Knable
(74) *Attorney, Agent, or Firm* — Finnegan, Henderson, Farabaw, Garrett & Dunner, L.L.P.

(57) ABSTRACT

Process for manufacturing a tyre, includes the following steps: (a) winding at least one metal wire so as to form a plurality of coils, the coils being radially superimposed and axially arranged side-by-side with respect to one another, so as to obtain a bead core; (b) applying at least one layer of a crosslinkable elastomeric material to the bead core obtained in step (a), so as to obtain a coated bead core; (c) partially crosslinking the at least one layer of crosslinkable elastomeric material, so as to obtain an amount of free sulfur of 30% by weight to 70% by weight, preferably of 40% by weight to 65% by weight, more preferably of 50% by weight to 60% by weight, with respect to the total weight of the sulfur present in the crosslinkable elastomeric material; and (d) applying a bead filler to the radial outer surface of the bead core obtained in step (c), so as to obtain a bead structure for a green tyre.

14 Claims, 5 Drawing Sheets

(56) References Cited

U.S. PATENT DOCUMENTS

| | | | | |
|---|---|---|---|---|
| 1,536,080 | A * | 5/1925 | Davidson | B29D 30/50 152/541 |
| 3,562,303 | A * | 2/1971 | Smith | C08J 3/203 525/332.6 |
| 3,730,244 | A * | 5/1973 | Ross | B29D 30/02 152/323 |
| 3,949,800 | A * | 4/1976 | Lejeune | B60C 15/04 152/540 |
| 3,957,718 | A * | 5/1976 | Pochert | C08J 5/10 524/723 |
| 4,014,632 | A * | 3/1977 | Golz | B29D 30/0606 425/28.1 |
| 4,252,589 | A * | 2/1981 | Hayakawa | B60C 13/001 152/524 |
| 4,357,976 | A * | 11/1982 | Mezzanotte | B60C 9/09 152/555 |
| 4,406,317 | A | 9/1983 | Merten | |
| 4,462,448 | A * | 7/1984 | Kawaguchi | B60C 15/0018 152/542 |
| 4,477,301 | A * | 10/1984 | Bouju | B29D 30/48 140/102 |
| 4,506,717 | A | 3/1985 | Thise-Fourgon | |
| 4,548,102 | A * | 10/1985 | DiRocco | B29C 73/08 152/370 |
| 4,942,093 | A * | 7/1990 | Lawson | B32B 7/12 428/423.3 |
| 5,007,471 | A | 4/1991 | Maiocchi | |
| 5,099,893 | A * | 3/1992 | Giorgetti | B29D 30/48 140/101 |
| 5,261,979 | A * | 11/1993 | Caretta | B29D 30/48 152/539 |
| 5,350,470 | A * | 9/1994 | Mochel | B29D 30/48 152/541 |
| 5,651,849 | A * | 7/1997 | Pizzorno | B29D 30/50 156/132 |
| 5,760,114 | A * | 6/1998 | Wideman | C08K 5/18 524/254 |
| 6,053,229 | A * | 4/2000 | Suzuki | B29D 30/32 152/541 |
| 6,255,379 | B1 * | 7/2001 | Hahn | B60C 1/00 524/492 |
| 6,426,378 | B1 * | 7/2002 | Lickes | B29C 35/02 524/262 |
| 6,524,416 | B1 * | 2/2003 | Kubinski | B29D 30/48 156/131 |
| 6,964,719 | B1 | 11/2005 | Van Hoose | |
| 6,972,061 | B1 * | 12/2005 | Kubinski | B29D 30/32 152/539 |
| 2004/0171545 | A1 * | 9/2004 | Chaikof | A61L 31/047 514/9.4 |
| 2004/0194871 | A1 * | 10/2004 | Caretta | B29D 30/00 156/111 |
| 2004/0241331 | A1 * | 12/2004 | Durairaj | C08L 61/06 427/387 |
| 2005/0028918 | A1 | 2/2005 | Caretta | |
| 2005/0126675 | A1 | 6/2005 | Maruoka | |

FOREIGN PATENT DOCUMENTS

| | | | | |
|---|---|---|---|---|
| EP | 1 086 977 A2 | | 3/2001 | |
| GB | 424526 | | 2/1935 | |
| GB | 802706 | | 10/1958 | |
| GB | 1163108 | * | 9/1969 | B60C 15/00 |
| GB | 2 064 442 A | | 6/1981 | |
| GB | 2064442 | * | 6/1981 | B29D 30/0005 |
| IT | 1151359 | * | 12/1986 | |
| JP | 2004-322815 | * | 11/2004 | B60C 1/00 |
| JP | 2004-322815 A | | 11/2004 | |
| JP | 2006-140280 | * | 6/2006 | H05K 9/00 |
| WO | WO 2006/079352 | * | 8/2006 | B60C 15/04 |
| WO | WO-2006/079352 A1 | | 8/2006 | |

OTHER PUBLICATIONS

Crosslinking Polymer Science Learning Center; Department of Polymer Science, The University of Southern Mississippi http://pslc.ws/macrog/xlink.htm, 2005.*

Precautions Need to Compound Insoluble Sulfur: Part 2 of 2 rubbernews.com Byron to et al, Sep. 2002.*

English language translation of IT 151359 (original document dated Dec. 1986).*

Machine generated English language translation of JP 2006-140280 (original document dated Jun. 2006) (Year: 2006).*

Machine generated English language translation of JP 2004-322815 (original document dated Nov. 2004) (Year: 2004).*

Barron, Harry, "Modern Rubber Chemistry," 1948, pp. 308-309.*

English translation of Search Report and Technical Examination Report dated Jun. 26, 2017, in counterpart Brazilian Application No. PI0622063-0 (7 pages).

* cited by examiner

PROCESS FOR MANUFACTURING A TYPE AND TYRE BEAD STRUCTURE

CROSS REFERENCE TO RELATED APPLICATION

This is a continuation of application Ser. No. 12/311,825, filed Apr. 15, 2009, that cams priority to PCT/EP2006/009964, filed Oct. 16, 2006, the content of which is incorporated herein by reference.

BACKGROUND INVENTION

Field of the Invention

The present invention relates to a process for manufacturing a tyre as well as to a tyre bead structure.

More in particular, the present invention relates to a process for manufacturing a tyre having an improved bead structure, said bead structure contributing in increasing the geometrical stability as well as the resistance to local deformations of the tyre bead region. Said tyre is particularly suitable for being used in trucks or lorries, especially for medium/heavy transport. Said tyre is also suitable for being used in light truck vehicles.

Moreover, the present invention also relates to a tyre bead structure.

Description of the Related Art

A tyre generally comprises: a carcass structure of a substantially toroidal shape, having opposite lateral edges associated with respective right-hand and left-hand bead structures, said bead structures comprising at least one bead core and at least one bead filler; a tread band; a belt structure placed between the carcass structure and the tread band; and a pair of sidewalls applied to said carcass structure in axially opposite positions.

Said bead structures perform the function of fixing the tyre on a respective rim. In particular, the bead core serves as anchorage for the carcass ply or plies, and, moreover, it withstands the forces exerted by the carcass under the effect of the inflation pressure as well as the deformations resulting from the use of the tyre. Furthermore, the bead core ensures the transmission of longitudinal forces and, in case of tubeless tyres, ensures the seal between the tyre and the wheel rim, the latter being provided in correspondence of the bead mounting position and comprising two substantially conical coaxial surfaces which act as the supporting base for the tyre beads. Said surfaces generally terminate in a flange, radially projecting outwardly, that supports the axially outer surface of the bead and against which the latter abuts by virtue of the tyre inflation pressure. Proper positioning of the bead into its seat is ensured by the conical shape of the bead seat in cooperation with the metal bead core.

Generally, as already reported above, the bead structure also comprises, in a position radially external to said bead core, a rubber strip, conventionally called bead filler (or "bead apex"), which has a substantially triangular cross-section and extends radially outwardly from the respective bead core.

In case a bead core is formed by winding a single wire (so as to form the so-called "single wire bead core") or a plurality of wires (so as to form a plurality of stacks of radially superimposed wound turns, each stack being formed by one specific wire), some problems generally arise both during the manufacturing process of the bead core and when the finished product is produced, in keeping the several convolutions lying in ordered convolutions and layers.

Generally, the wires forming the tyre bead cores are coated with a rubber composition. Since mounting of the tyre on the wheel rim and removal of the tyre therefrom require that the tyre bead steps over the rim flange, the latter having a diameter greater than the radially inner diameter of the bead core, the bead core needs to be deformed so as to take an elliptical configuration (ovalization) in order to allow the above mentioned operations (mounting on and dismounting from the wheel rim) to be carried out. However, especially in case tubeless tyres of large size are considered (e.g., truck tyres), if the tyre bead core is made of rubberized wires, after vulcanization the bead core becomes rigid and compact, thus scarcely flexible. In order to solve such a problem, provision was made of bead cores formed of bare wires (i.e. non-rubberized wires) which are able to displace circumferentially with respect to one another and thus to allow the required deformation (ovalization) of the bead core, even in the cured tyre. However, bead cores formed of bare wires do not possess sufficient geometrical stability and torsional strength to withstand the stresses exerted onto the bead cores both during the tyre manufacturing steps (especially during vulcanization and moulding steps of the green tyre) and during the use of the tyre.

It may be noted that this aspect is even more critical since the bead seat is generally inclined with respect to the tyre rotation axis, negatively affecting the geometrical stability of the bead core convolutions.

Some technical solutions are known in the art to confer an annular shape to the bead core and to contribute in keeping the desired shape both during the manufacturing of the tyre and the use thereof, so that irregular displacement of the wires convolutions may be reduced and the latter are held together to ensure a correct alignment of said wires and a good frictional contact thereof.

For example, U.S. Pat. No. 3,949,800 discloses a pneumatic tyre whose beads are provided with bead rings of the package type having improved stability of shape, said package ring being formed of one or more wires having a quadrilateral section with at least two parallel opposite sides, the adjoining turns of wires touching each other both in the radial direction and in the axial direction along their facing surfaces. According to this document the bead core is preferably surrounded by a covering which comprises an insert of stuffing rubber in contact with the bead core and a rubber sheathing which clamps said insert.

U.S. Pat. No. 4,406,317 discloses a pneumatic tyre comprising bead cores made of wire layers wound to be placed over one another and consisting of wires having an angular cross section. Due to the periodic stress of the tyre in movement, in order to avoid points of break of the carcass at the edges of the bead core, it has been customary to mould hard rubber compositions about the bead cores. Then, in order to save costs, it was preferred to wrap the bead cores with protective strips that are substantially accommodated to the contour of the bead cores and surrounding the corners thereof by rounding them off.

U.S. Pat. No. 5,007,471 discloses a metal core used for reinforcing tyre beads which is constituted by a plurality of coils of metal wire, said metal wire being of the type defined as "metal strap", axially arranged side-by-side and radially superimposed, in which the wire has a cross-section of modular shape with two equal and parallel opposite sides, the profile of the opposite sides having a distance, from the axis of said pair of sides, whose values varies from one side to the other, said variation comprising at least one symmetrical deviation along the development of its cross-sectional profile. The abovementioned metal core is said to be particularly useful in large-size tubeless tyres. Moreover, said metal core is said to be stable and extremely resistant to torsional stresses so that its section compactness may be easily maintained and ensured even when the core has to be assembled in the tyre carcass and during the tyre curing and moulding only by means of a reduced number of suitable check elements, as the strips which are illustrated, for example, in FIG. 7, which are wound up around the kern, i.e. the package of straps, and are situated circumferentially along the peripheral development of the core at a few points, for instance only at two point in diametrically opposite position.

Great Britain Patent Application GB 2,064,442 discloses a tyre bead reinforcement comprising a circumferentially inextensible core enclosed in elastomeric material, the material forming the outer surface of the reinforcement having a lower vulcanizing speed than the remainder of the elastomeric material in the reinforcement. The semivulcanization of said tyre bead reinforcement which is carried out prior to assembly in a tyre, is said to result in the material immediately surrounding the core being sufficiently vulcanized to prevent distortion of the core during tyre building while the material constituting the outer surface is still unvulcanized so as to enable satisfactory adhesion of the reinforcement to adjacent components of the tyre during building without any additional treatment of the reinforcement (e.g., application of an adhesive).

U.S. Pat. No. 5,261,979 discloses a process for manufacturing a tyre having a pair of metal bead cores, each bead core having a plurality of coils made of bare metal wire disposed axially in side-by-side relation and radially superposed, wherein a covering structure is associated with each bead core, which structure consists of a sheet made of unvulcanized elastomeric material wrapped around the bead core and a strip of unvulcanized rubberized fabric, reinforced with heat-shrinkable material cords, wound around the elastomeric material sheet. The bead cores are subsequently assembled with other tyre components, and afterwards a tyre vulcanization step is carried out. During this step the chemical bonding between the elastomeric sheet and the bead core is achieved, which bonding is promoted by the simultaneous shrinkage of the cords provided in the rubberized fabric strip. It this document, it is said that, by virtue of the excellent chemical bonding that occurs between the bead core and the sheet made of unvulcanized elastomeric material wrapped around the bead core, possible detachments between the bead core and the rubber incorporating it are practically eliminated in a tyre in use, which brings about an increase in the tyre lifetime, particularly as regard the possibility of retreading it.

SUMMARY OF THE INVENTION

With respect to the known solutions mentioned above, the Applicant has perceived, in particular when bare metal wires are used, the need of improving the geometrical stability of the tyre bead region and the structural strength thereof, in particular its resistance to local deformations, both during the tyre manufacturing process steps successive to the bead core production and assembling within the tyre structure and during the use of the tyre (i.e. during revolution of the tyre on the ground).

In particular, the Applicant has perceived the need of increasing resistance of the tyre bead to local deformations without negatively affecting the tyre bead flexibility which is advantageously required, for instance, during the mounting of the tyre on the wheel rim and during the dismounting of the tyre therefrom.

The Applicant has noticed that said local deformations, which are exerted on the convolutions of the wires forming the tyre bead cores, are mainly due to the following reasons.

Firstly, said deformations are generally caused by the tyre manufacturing steps following the bead core production step, in particular the moulding and vulcanization steps carried out on the finished green tyre.

Secondly, said deformations are due to the stress concentrations arising in the tyre bead region as a consequence of the relevant load carried by the vehicle, said stresses causing the tyre bead to bulge out laterally beyond the rim edge. This is particularly true in the case of high duty vehicles which are requested to withstand loads, and sometimes overloads, of great entity.

The Applicant has noticed that the moulding and vulcanization steps which are carried out on the finished green tyre, may cause the convolutions of the wires to move with respect to each other in the cross-section of the bead cores so causing disalignements of the same in the cross-section. Consequently, remarkable differences in tensioning of the wires may occur, which eventually may cause a relevant decrease of resistance to rupture of said elements. Moreover, the Applicant has noticed that a remarkable distortion of the wires convolutions in the cross-section of the tyre bead cores and the consequent formation of a non-planar configuration thereof inevitably results in a geometrical distorted tyre bead and/or in loss of a precise bead position in the cured tyre.

Moreover, the Applicant has also noticed that, when a partial vulcanization of the elastomeric material coating the bead core is carried out, it is necessary to achieve the following results:

to give a specific strength and stiffness to the tyre bead structures to prevent disalignement and lost of final geometrical shape, without negatively affecting its flexibility;

to guarantee a good adhesion between the elastomeric material and the metal wire forming the bead core, in particular when bare metal wires are used;

to prevent flow of the elastomeric material during the tyre bead structures assembly (e.g., during the application of the bead filler) as well as during the moulding and vulcanization steps carried out on the finished green tyre;

to avoid an overcuring of the tyre bead structures during the vulcanization of the finished green tyre, said overcuring causing reversion phenomena which may result in a deterioration of the road-holding of the tyre.

The Applicant has found that said requirements may be achieved by providing a process for manufacturing a tyre including bead structures comprising at least one bead core and at least one bead filler, said process comprising the application of at least one layer of a crosslinkable elastomeric material around a plurality of coils of metal. Wires, in particular of bare metal wires, forming said at least one bead core, said at least one layer of crosslinkable elastomeric material being subsequently subjected to a partial vulcanization in such a way that, after said partial vulcanization, said elastomeric material has an amount of free sulfur of from 30% by weight to 70% by weight with respect to the total weight of the sulfur present in said crosslinkable elastomeric material.

Said process allows to obtain a tyre including bead structures showing the desired structural strength which allow to ensure a good geometrical stability of the same both during a manufacturing process and during the use of the tyre, without negatively affect its flexibility degree. Furthermore, a good adhesion between the metal wires, in particular when bare metal wires are used, and the crosslinkable elastomeric material is obtained. Moreover, the overcuring of the tyre bead structures during vulcanization of the green tyre is avoided (i.e. reversion phenomena do not occur). Furthermore, the obtained tyre includes bead structures which allow to achieve an easy mounting/dismounting of the tyre on/from the wheel rim while providing, at the same time, a uniform and correct engagement of the tyre bead region with the rim flange along the whole circumferential profile of the tyre bead.

According to a first aspect the present invention relates to a process for manufacturing a tyre, said tyre comprising:

a carcass structure of a substantially toroidal shape, having opposite lateral edges associated with respective right-hand and left-hand bead structures, each bead structure comprising at least one bead core and at least one bead filler;

a belt structure applied in a radially external position with respect to said carcass structure;

a tread band radially superimposed on said belt structure;

a pair of sidewalls applied laterally on opposite sides with respect to said carcass structure;

said process comprising the following steps:

(a) winding at least one metal wire so as to form a plurality of coils, said coils being radially superimposed and axially arranged side-by-side with respect to one another, so as to obtain a bead core;

(b) applying at least one layer of a crosslinkable elastomeric material to the bead core obtained in step (a), so as to obtain a coated bead core;

(c) partially crosslinking said at least one layer of crosslinkable elastomeric material, so as to obtain an amount of free sulfur of from 30% by weight to 70% by weight, preferably of from 40% by weight to 65% by weight, more preferably of from 50% by weight to 60% by weight, with respect to the total weight of the sulfur present in said crosslinkable elastomeric material;

(d) applying a bead filler to the radial outer surface of the bead core obtained in step (c), so as to obtain a bead structure;

(e) applying the bead structure obtained in step (d) to a green carcass structure;

(f) completing the green carcass structure to obtain a green tyre structure;

(g) moulding and vulcanizing the green tyre structure obtained in step (f) so as to obtain a finished tyre.

The amount of free sulfur may be determined according to techniques known in the art such as, for example, by determining the amount of combined sulfur by means of the combustion in oxygen after extraction with acetone according to Standard ASTM D297-93(2002)$^{\varepsilon 2}$: further details about said determination will be given in the examples which follows.

For the purpose of the present description and of the claims which follow, all ranges include any combination of the maximum and minimum points disclosed and include any intermediate ranges therein, which may or may not be specifically enumerated herein.

According to a further aspect, the present invention relates to a tyre bead structure comprising:

at least one bead core comprising a plurality of coils of at least one metal wire, said coils being radially superimposed and axially arranged side-by-side with respect to one another; and at least one bead filler;

wherein said bead core is coated with at least one partially crosslinked layer of a crosslinkable elastomeric material, said partially crosslinked layer comprising an amount of free sulfur of from 30% by weight to 70% by weight, preferably of from 40% by weight to 65% by weight, more preferably of from 50% by weight to 60% by weight, with respect to the total weight of the sulfur present in said crosslinkable elastomeric material.

According to one preferred embodiment, said at least one metal wire is a bare metal wire.

According to one preferred embodiment, after said partially crosslinking step (c) is carried out, said at least one layer of elastomeric material has a dynamic elastic modulus (E'), measured at 100° C., lower than or equal to 28 MPa, preferably of from 18 MPa to 25 MPa.

The dynamic elastic modulus (E') may be measured using an Instron dynamic device in the traction-compression mode: further, details regarding the above measurement methods will be given in the examples which follow.

According to one preferred embodiment, after said partially crosslinking step (c) is carried out, said at least one layer of elastomeric material has a dynamic shear elastic modulus (G') measured at 70° C., at a frequency of 10 Hz, with a deformation of 9%, lower than or equal to 15 MPa, preferably of from 7 MPa to 12 MPa.

The dynamic elastic modulus (G') may be measured according to Standard ASTM D6601-02: further details regarding the above measurement methods will be given in the examples which follow.

According to one preferred embodiment, said process may comprise, before carrying out said partially crosslinking step (c), a further step ($b_1$) of applying at least one layer of crosslinkable elastomeric material into which reinforcing cords of heat-shrinkable material are embedded, around the coated bead core obtained in step (b).

According to one preferred embodiment, said process may comprise, after said partially crosslinking step (c) is carried out, a further step ($c_1$) of applying at least one layer of crosslinkable elastomeric material, into which, optionally, reinforcing cords of heat-shrinkable material are embedded, around the coated bead core obtained in step (c) [i.e. around the partially crosslinked coated bead core obtained in step (c)].

According to a further preferred embodiment, said process may comprise, after said partially crosslinking step (c) is carried out, a further step ($c_2$) of surface-treating the coated bead core obtained in step (d).

The abovementioned further steps ($c_1$), or ($c_2$), allow to improve the adhesion of the partially crosslinked coated bead core obtained in step (c) with the bead filler applied in step (d), as well as with the other tyre structural elements in the bead zone during the remaining part of the tyre manufacturing process.

According to a further preferred embodiment, said step (a) is carried out by winding a plurality of metal wires (or cords), preferably bare metal wires (or cords), each individual metal wire (or cord) being radially coiled onto itself so as to form a stack of radially superimposed wound coils.

According to one preferred embodiment, said metal wires have a substantially rectangular cross-section. Alternatively, said metal wires comprise, in a cross-section, two axially extending rectilinear and parallel opposite sides and two radially extending non-rectilinear lateral sides. Preferably, said non-rectilinear lateral sides are shaped so that, when two wires are radially stacked, their lateral sides form a profile that is complementary to the profile of an axially adjacent wire that may interfit therewith. In such a way, the obtained assembly is such that only a portion of the lateral side of one wire contacts only a portion of the lateral side of the axially adjacent metal wire. Preferably, the metal wires have a substantially hexagonal cross section. Such technical solutions are disclosed, for instance, in U.S. Pat. No. 5,007,471 above disclosed.

Preferably, the bead core according to the present invention further comprises a plurality of fastening elements, for instance in the form of metallic clips or strips, which are periodically applied along the bead core circumference so as to maintain the compactness of the convolutions of the metal wires forming the bead core.

According to one preferred embodiment, said metal wire(s) (or cords) used in step (a) is/are made of steel. Usually, the breaking strength of said steel ranges from 1,600 N/mm$^2$ (or 1,600 MPa—MegaPascal) to 2,000 N/mm$^2$. Alternatively, a standard NT (normal tensile) steel having a breaking strength ranging from 2,600 N/mm$^2$ (or 2,600 MPa MegaPascal) to 3,200 N/mm$^2$, may be used. Said breaking strength values depend in particular on the quantity of carbon contained in the steel.

Generally, said metal wire are provided with a brass coating (Cu of from 60% to 75% by weight, Zn of from 40% to 25% by weight), having a thickness of from 0.10 μm to 0.50 μm. Said coating ensures better adhesion of the metal wire to the elastomeric material and provides for protection against corrosion of the metal, both during production of the tyre and during use thereof. Should it be necessary to ensure a greater degree of protection against corrosion, said metal wire may be advantageously provided with an anti-corrosive coating other than brass, able to ensure a greater corrosion resistance, such as, for example, a coating based on zinc, zinc/manganese (ZnMn) zinc/cobalt alloys or alloys (ZnCo) zinc/cobalt/manganese (ZnCoMn) alloys.

According to one preferred embodiment, said step (b) of applying at least one layer of a crosslinkable elastomeric material to the bead core obtained in step (a), is carried out by loop-wise wrapping around the bead core said at least one layer of crosslinkable elastomeric material.

Advantageously, in the loop-wise wrapping, said layer of crosslinkable elastomeric material has a length slightly greater than the circumferential extension of the bead core and a width greater (e.g., 25%-50% greater) than the distance around the periphery of the polygonal cross-section of the bead core. In this way, a partial overlapping of the lateral edges of said layer is obtained.

According to a further preferred embodiment, said step (b) of applying said at least one layer of a crosslinkable elastomeric material to the bead core obtained in step (a), is carried out by helically winding said at least one layer of crosslinkable elastomeric material around the bead core.

According to one preferred embodiment, said at least one layer of crosslinkable elastomeric material has a thickness of from 0.2 mm to 2.0 mm, preferably of from 0.5 mm to 1.5 mm.

According to one preferred embodiment, said partially crosslinking step (c) is carried out at a temperature of from 110° C. to 160° C., preferably of from 125° C. to 150° C., for a time of from 10 min to 40 min, preferably of from 15 min to 25 min.

Said partially crosslinking step (c) may be carried out by means of apparatuses known in the art such as, for example, by means of an autoclave, an oven, a compression moulding device. The autoclave is particularly preferred.

As reported above, a further step ($b_1$) of applying at least one layer of crosslinkable elastomeric material into which reinforcing cords of heat-shrinkable material are embedded, around the coated bead core obtained in step (b), may be carried out.

According to one preferred embodiment, said step ($b_1$) is carried out by helically winding said at least one layer around the coated bead core obtained in step (b) so as to completely envelope said bead core along the circumferential profile thereof. Preferably, said winding is carried out in order to obtain axially adjacent coils closely side-by-side (i.e. in order to avoid the presence of gaps between said axially adjacent coils). Moreover, preferably, a partial overlapping of said axially adjacent coils is avoided.

Alternatively, said step ($b_1$) is carried out by loopy wise wrapping said at least one layer around the coated bead core obtained in step (b). Preferably, in this case, it is convenient to carry out a pre-assembling of said at least one layer of crosslinkable elastomeric material used in step (b) and of said at least one layer used in step ($b_1$), so that the bead covering may be performed by a single looping operation.

According to one preferred embodiment, said at least one layer of crosslinkable elastomeric material into which reinforcing cords of heat-shrinkable material are embedded, has a thickness of from 0.4 mm to 1.5 mm, preferably of from 0.5 mm to 1.0 mm.

As reported above, a further step ($c_1$) of applying at least one layer of crosslinkable elastomeric material, into which, optionally, reinforcing cords of heat-shrinkable material are embedded, around the coated bead core obtained in step (c), may be carried out.

According to one preferred embodiment, said step ($c_1$) is carried out by helically winding said at least one layer around the partially crosslinked coated bead core obtained in step (c) so as to completely envelope said bead core along the circumferential profile thereof. Preferably, said winding is carried out in order to obtain axially adjacent coils closely side-by-side (i.e. in order to avoid the presence of gaps between said axially adjacent coils). Moreover, preferably, a partial overlapping of said axially adjacent coils is avoided.

Alternatively, said step ($c_1$) is carried out by loop-wise wrapping said at least one layer around the partially cross-linked coated bead core obtained in step (c).

According to one preferred embodiment, said at least one layer of crosslinkable elastomeric material into which, optionally, reinforcing cords of heat-shrinkable material are embedded, has a thickness of from 0.4 mm to 1.5 mm, preferably of from 0.5 mm to 1.0 mm.

With regard to the reinforcing cords of heat-shrinkable material which may be embedded into said at least one layer of crosslinkable elastomeric material, they are preferably made of thermoplastic polymers such as, for example, nylon, polyethyleneterephthalate (PET), polythelenenaphthalate (PEN), and disposed in said layer as closely as possible with respect to their size. Practically it is convenient to speak of a "filling coefficient" of the layer of crosslinkable elastomeric material, expressed as the percent ratio between the total cross-section area taken by the bare reinforcing cords of heat-shrinkable material and the total cross-section area of said layer, the value of which will advantageously be of from 10% to 70%, preferably of from 15% to 30%.

The reinforcing cords of heat-shrinkable material are usually disposed in the layer of crosslinkable elastomeric material substantially parallel to each other while, when said layer is helically wound onto the bead core, said reinforcing cords are usually inclined with respect to the transversal direction of the bead core with an angle in the range of from 15 to 45°.

As reported above, a further step ($c_2$) of surface-treating the coated bead core obtained in step (c), may be carried out.

According to one preferred embodiment, said step ($c_2$) is carried out by dipping the bead core obtained in step (c) into an elastomeric solution (solutioning step).

According to one preferred embodiment, said at least one layer of crosslinkable elastomeric material used in the above step (b), includes a crosslinkable elastomeric composition comprising:
- at least one elastomeric polymer;
- at least one adhesion promoting additive;
- sulfur or derivatives thereof in an amount higher than or equal to 6 phr, preferably of from 8 phr to 12 phr.

For the purposes of the present description and of the claims which follow, the term "phr" means the parts by weight of a given component of the crosslinkable elastomeric composition per 100 parts by weight of the elastomeric polymer(s).

According to one preferred embodiment, said at least one elastomeric polymer may be selected from diene elastomeric polymers commonly used in sulfur-crosslinkable elastomeric compositions, that are particularly suitable for producing tyres, that is to say from elastomeric polymers or copolymers with an unsaturated chain having a glass transition temperature ($T_g$) generally below 20° C., preferably in the range of from 0° C. to −110° C. These polymers or copolymers may be of natural origin or may be obtained by solution polymerization, emulsion polymerization or gas-phase polymerization of one or more conjugated diolefins, optionally blended with at least one comonomer selected from monovinylarenes and/or polar comonomer in an amount of not more than 60% by weight.

Preferably, said diene elastomeric polymer may be selected, for example, from cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

Alternatively, said at least one elastomeric polymer, may be selected from elastomeric polymers of one or more monoolefins with an olefinic comonomer or derivatives thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

According to one preferred embodiment, said at least one adhesion promoting additive may be selected, for example, from:
- salts of bivalent cobalt which may be selected from carboxylate compounds of formula (R—CO—O)$_2$Co wherein R is a $C_6$-$C_{24}$ aliphatic or aromatic group (such as, for example, cobalt neodecanoate);
- organometallic complex based on boron and cobalt, the latter being linked together through oxygen (such as, for example, the complex known under the tradename of Manobond® 680C from OMG group);
- resorcinol/hexamethoxymethylenemelamine (HMMM) system or resorcinol/hexamethylenetetramine (HMT) system;

or mixtures thereof. Preferably, a mixture of an organometallic complex based on boron and cobalt with a resorcinol/hexamethoxymethylenemelamine (HMMM) system is used.

According to one preferred embodiment, said at least one adhesion promoting additive is present in the crosslinkable elastomeric composition in an amount of from 0.2 phr to 3 phr, preferably of from 0.5 phr to 2.5 phr.

According to one preferred embodiment, said sulfur or derivatives thereof may be selected, for example, from:
- soluble sulfur (crystalline sulfur);
- insoluble sulfur (polymeric sulfur);
- sulfur dispersed in oil (for example 33% sulfur known under the trade name Crystex® OT33 from Flexsys);
- sulfur donors such as, for example, tetramethylthiuram disulfide (TMTD), tetrabenzylthiuram disulfide (TBzTD), tetraethylthiuram disulfide (TETD), tetrabutylthiuram disulfide (TBTD), dimethyldiphenylthiuram disulfide (MPTD), penta-methylenethiuram tetrasulfide or hexasulfide (DPTT), morpholinobenzothiazole disulfide (MBSS), N-oxydiethylenedithiocarbamyl-N'-oxydiethylenesulfenamide (OTOS), dithiodimorpholine (DTM or DTDM), caprolactam disulfide (CLD), or mixtures thereof;

or mixtures thereof.

At least one reinforcing filler may advantageously be added to the crosslinkable elastomeric composition(s) above disclosed, in an amount generally of from 10 phr to 120 phr, preferably of from 20 phr to 90 phr. The reinforcing filler may be selected from those commonly used for crosslinked manufactured products, in particular for tyres, such as, for example, carbon black, silica, alumina, aluminosilicates, calcium carbonate, kaolin, or mixtures thereof.

Moreover, at least one activator (e.g., a zinc compound), and/or at least one accelerator (e.g., a sulphenamide), may advantageously be added to the crosslinkable elastomeric composition(s) above disclosed.

Said moulding and vulcanizing step (d) may be carried out according to techniques and using apparatus that are known in the art, as described, for example, in European Patents EP 199,064, or in U.S. Pat. No. 4,872,822, or U.S. Pat. No. 4,766,937.

BRIEF DESCRIPTION OF THE DRAWINGS

Further features and advantages will appear more clearly with reference to the detailed description of some embodiments of a bead core, a tyre bead structure and of a tyre according to the present invention. Said description, given hereinbelow, refers to the accompanying drawings which are provided solely by way of a non-limiting example and in which.

DETAILED DESCRIPTION OF THE INVENTION

Figure 1:
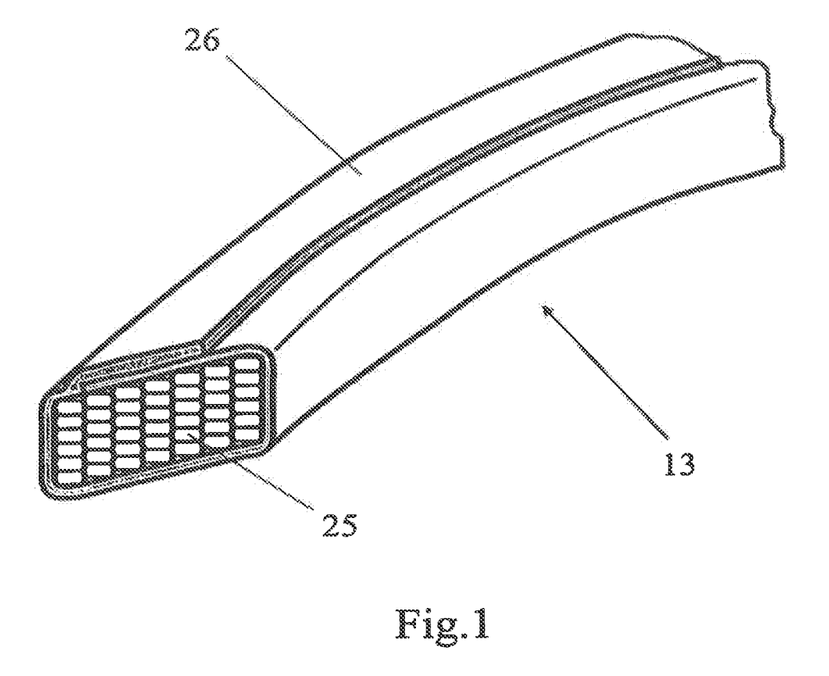
FIG. 1 shows a partial perspective view of a first embodiment of a coated bead core obtained according to the present invention.

FIG. 1 shows a partial perspective view of a first embodiment of a coated bead core 13 according to the present invention. In particular, FIG. 1 shows a bead core 25 which is obtained by winding a plurality of bare wires, each wire being radially wound to form a stack of radially superimposed coils. In FIG. 1, seven wires are used (so that seven axially adjacent stacks are formed), each wire being spirally wound to form six radially superimposed coils. Said bead core 25 is coated with a layer of a crosslinkable elastomeric material 26 which was applied to the bead core 25 by loop-wise wrapping.

Figure 2:
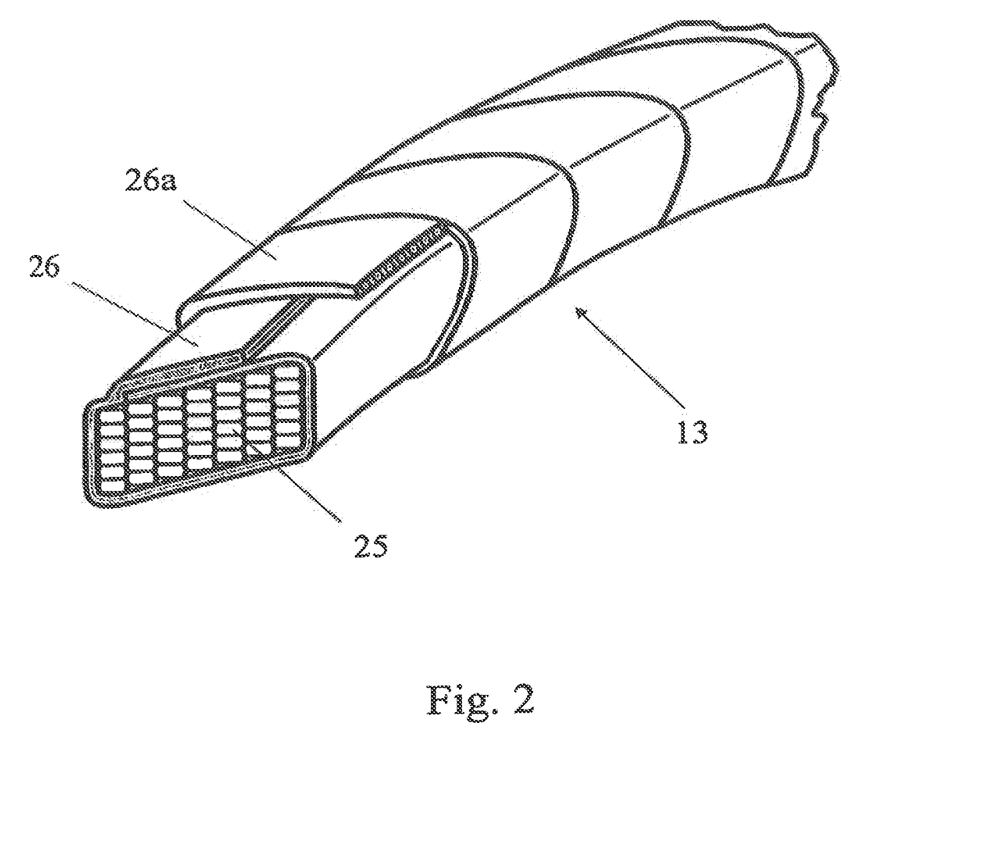
FIG. 2 shows a partial perspective view of a second embodiment of a coated bead core obtained according to the present invention.

FIG. 2 shows a partial perspective view of a second embodiment of a coated bead core 13 according to the present invention. In particular, FIG. 2 shows a bead core 25 which is obtained by winding a plurality of bare wires, each wire being radially wound to form a stack of radially superimposed coils. In FIG. 2, seven wires are used (so that seven axially adjacent stacks are formed), each wire being spirally wound to form six radially superimposed coils. Said bead core 25 is coated with a layer of a crosslinkable elastomeric material 26 which was applied to the bead core 25 by loop-wise wrapping. Moreover, FIG. 2 shows a further layer of a crosslinkable elastomeric material into which reinforcing cords of heat-shrinkable material are embedded 26a which was helically wound around said layer of a crosslinkable elastomeric material 26, in such a way that a partial overlapping of axially adjacent coils is avoided.

Figure 3:
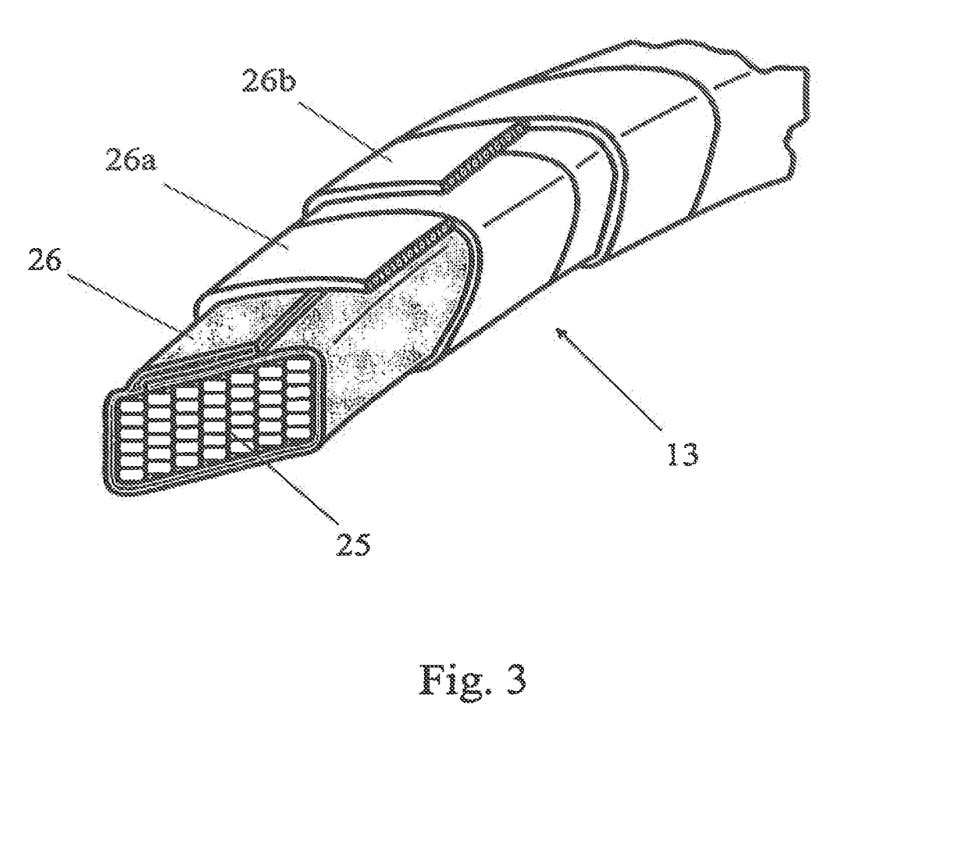
FIG. 3 shows a partial perspective view of a third embodiment of a coated bead core obtained according to the present invention.

FIG. 3 shows a partial perspective view of a third embodiment of a coated bead core 13 according to the present invention. In particular, FIG. 3 shows a bead core 25 which is obtained by winding a plurality of bare wires, each wire being radially wound to form a stack of radially superimposed coils. In FIG. 3, seven wires are used (so that seven axially adjacent stacks are formed), each wire being spirally wound to form six radially superimposed coils. Said bead core 25 is coated with a layer of a crosslinkable elastomeric material 26 which was applied to the bead core 25 by loop-wise wrapping. Moreover, FIG. 3 shows a further layer of crosslinkable elastomeric material into which reinforcing cords of heat-shrinkable material are embedded 26a, which was helically wound around said layer of a crosslinkable elastomeric material 26 in such a way that a partial overlapping of axially adjacent coils is avoided, as well as a still further layer of a crosslinkable elastomeric material into which reinforcing cords of heat-shrinkable material are embedded 26b, which was helically wound around said layer 26a in such a way that a partial overlapping of axially adjacent coils is avoided.

Figure 4:
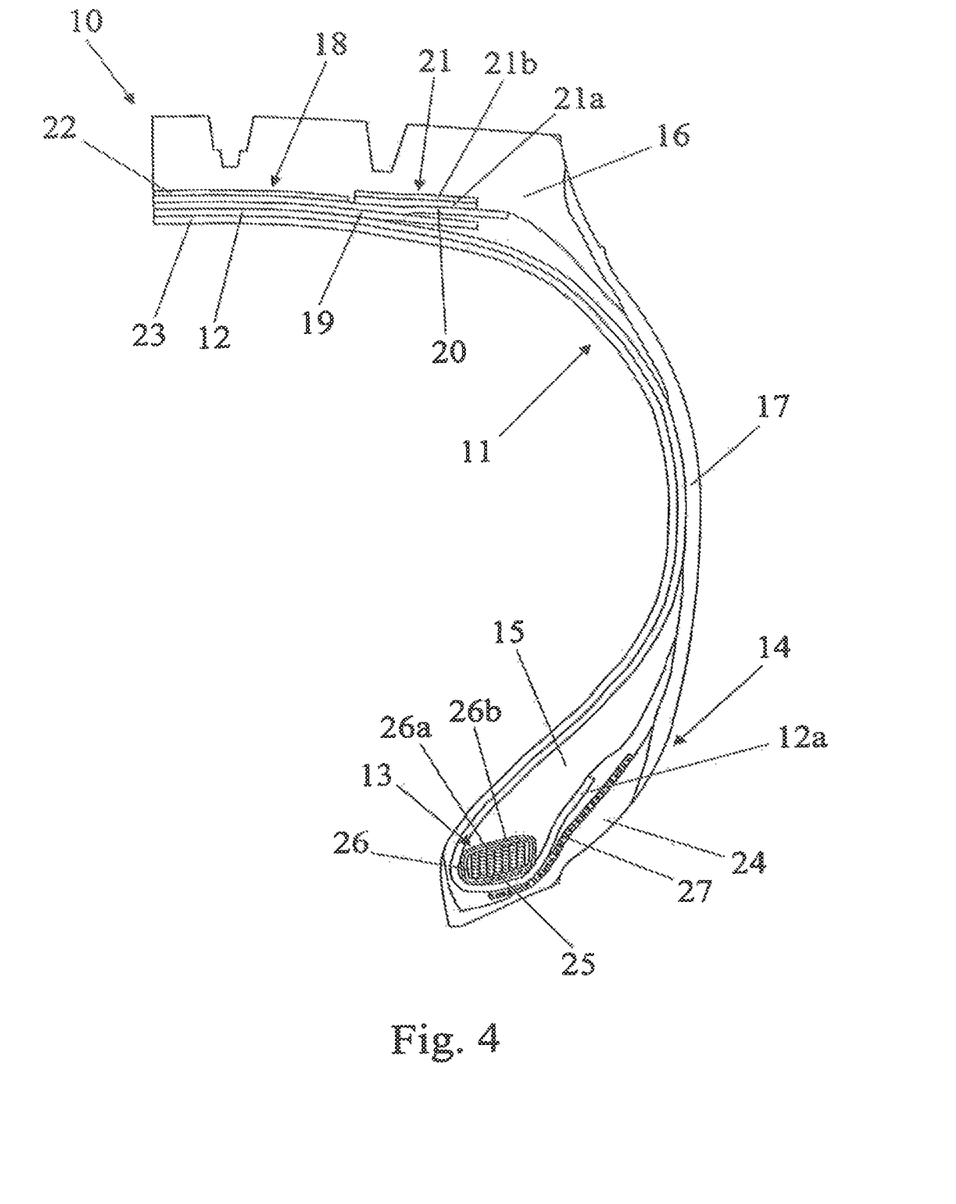
FIG. 4 shows a partial cross-sectional view of a tyre comprising a bead structure obtained according to the present invention.

FIG. 4 shows a partial cross-sectional view of a tyre 10 comprising a bead structure obtained according to the present invention and suitable for being mounted on a wheel rim not shown). For simplicity, FIG. 4 shows only a portion of the tyre, the remaining portion not represented being identical and symmetrically arranged with respect to the equatorial plane of the tyre.

The tyre 10 includes a carcass structure 11 comprising a carcass ply 12, the ends of which are associated with respective bead structures 14 obtained according to the present invention comprising at least one coated bead core 13 and at least one bead filler 15.

In accordance with the embodiment shown in FIG. 4, the carcass ply 12 is folded back to the respective bead cores 25 by turning up the carcass ply ends around said coated bead core 13, so as to form the so called carcass back-fold (12a).

The coated bead cores 13 are axially spaced from each other and are incorporated in respective bead structures 14, in a position radially internal to the tyre.

In addition to the bead core 13, the bead structure 14 further comprises a bead filler 15, in a position radially external to the coated bead core 13.

The carcass ply 12 generally consists of a plurality of reinforcing elements arranged parallel to each other and at least partially coated with a layer of a crosslinked elastomeric material. These reinforcing elements are usually made of steel wires stranded together, coated with a metal alloy (such as, for example, copper/zinc, zinc/manganese, zinc/molybdenum/cobalt alloys, and the like), or of textile fibres such as, for example, rayon, nylon or polyethylene terephthalate.

Preferably, the carcass is of the radial type and namely incorporates reinforcing cords arranged in a direction substantially perpendicular to the equatorial plane of the tyre.

The tyre 10 comprises, moreover, a tread band 16, located on the crown of said carcass 11, and a pair of axially opposite sidewalls 17, each arranged between the respective bead structure 14 and the tread band 16.

Between the carcass ply 11 and the tread band 16, the tyre 10 comprises, moreover, a belt structure 18 which, in the example shown in FIG. 4, envisages two radially superimposed belt plies 19, 20, two lateral reinforcing strips 21 and a breaker layer 22.

In detail, the belt plies 19, 20, which are radially superimposed on each other, incorporate a plurality of reinforcing cords, which are typically metallic and obliquely oriented with respect to the equatorial plane of the tyre, parallel with each other in each ply and intersecting with those of the adjacent ply so as to form a predetermined angle with respect to a circumferential direction. Generally, said angle is comprised from about 10 to about 40°; preferably, said angle is comprised from about 12° to about 30°.

As mentioned above, the belt structure 18 further comprises two lateral reinforcing strips 21, commonly known as "zero-degree reinforcing strips", radially superimposed on the axially outer edges of the radially external belt layer 20. Said reinforcing strips 21 generally incorporate a plurality of reinforcing elements, typically metal cords with a breakage elongation value of from 3% to 10%, preferably of from 3.5% to 7%. Said reinforcing elements are coated by means of a crosslinked elastomeric material and oriented in a substantially circumferential direction, thus forming an angle of very few degrees (i.e. 0°) with respect to the equatorial plane of the tyre. According to the embodiment shown in FIG. 4 each lateral reinforcing strip 21 is formed of two radially superimposed layers 21a, 21b. Alternatively, each lateral reinforcing strip 21 may be formed of only one layer (not shown in FIG. 4). Alternatively, instead of two lateral reinforcing strips 21, a continuous reinforcing layer, generally incorporating a plurality of reinforcing elements of the same kind disclosed above, which extends along the whole axial development of said belt structure may be present (not shown in FIG. 4).

As mentioned above, the belt structure 18 further comprises a breaker layer 22 which is radially superimposed on the radially external belt layer 20 and interposed between the lateral reinforcing strips 21. Alternatively, the breaker layer extends over the reinforcing strips 21 (said embodiment being not shown in FIG. 4). The breaker layer 22 is provided with reinforcing elements, typically metal cords, that are coated by means of a crosslinked elastomeric material and arranged parallel to one another and inclined with respect to the equatorial plane of the tyre by an angle of from 10° to 70°, preferably of from 12° to 40°. The breaker layer 22 acts as a protection layer from stones or gravel possibly entrapped into the tread grooves and which may cause damages to the belt layers 19, 20 and even to the carcass ply 12.

Alternatively (said embodiment being not shown in FIG. 4), the belt structure envisages three radially superimposed belt plies and a breaker layer in a position radially external to said superimposed belt plies.

Alternatively (said embodiment being not shown in FIG. 4), the belt structure envisages two radially superimposed belt plies, one zero-degree lateral reinforcing strip that is radially superimposed on the axially outer edge of the radially external belt ply and a breaker layer in a position radially external to said reinforcing strip and the radially external belt ply (the breaker layer may only partially overlap the lateral reinforcing strip).

In the case of tubeless tyres, in a position radially internal to said carcass ply 12, a rubberized layer 23, the so-called "liner", is also envisaged, said layer being able to provide the tyre 10, during use, with the necessary impermeability to air.

Moreover, an antiabrasive strip 24 is usually placed in an axially external position relative to the carcass back-fold.

The coated bead core 13 of tyre 10 obtained according to the present invention, is that one represented in FIG. 3; consequently, the reference signs 13, 25, 26, 26a and 26b have the same meanings as disclosed in the above FIG. 3.

According to the embodiment of FIG. 4, the tyre 10 further comprises a reinforcing layer 27 which is generally known with the term of "chafer" and which has the function of increasing the bead stiffness.

The chafer 27 comprises a plurality of elongated reinforcing elements which are embedded in an elastomeric material and which are generally made of textile materials (e.g., aramide, or rayon) or metallic materials (e.g., steel cord).

The chafer may be located in a plurality of positions inside of the tyre bead and/or sidewall. According to the embodiment shown in FIG. 4, the chafer 27 is located in a position axially external with respect to the carcass ply 12. In case the tyre is provided with two carcass plies, the chafer may be positioned between said carcass plies. Preferably, the chafer starts in correspondence of the radially external portion of the bead core, it follows the perimetral profile of the bead filler and ends in correspondence of the tyre sidewall (not shown in FIG. 4).

Alternatively, the chafer may extend along the tyre sidewall, up to the ends of the tyre belt structure (not shown in FIG. 4).

Preferably, the wheel rim (not shown in FIG. 4) on which the tyre of the present invention is mounted is provided with bead seats that are inclined at an angle of about 15° with respect to the tyre rotation axis.

Figure 5:
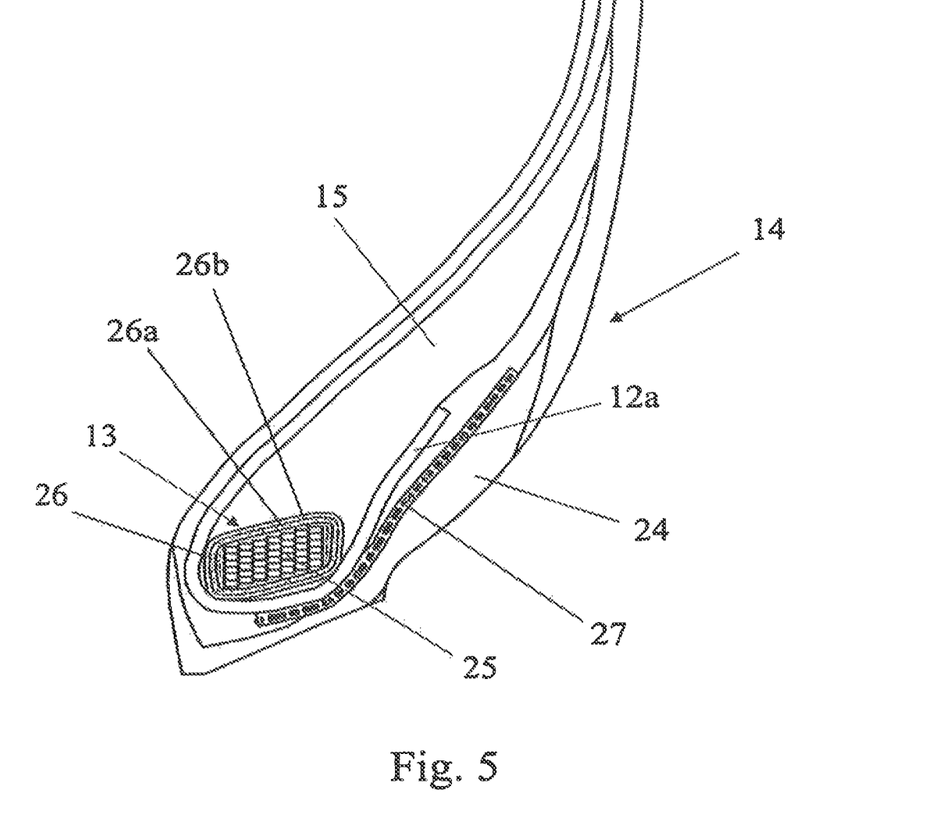
FIG. 5 shows an enlarged partial cross-sectional view of the bead structure of a tyre of FIG. 3.

FIG. 5 shows an enlarged partial cross-sectional view of a bead structure of a tyre 10 of FIG. 4; consequently, the reference signs 12a, 13, 14, 15, 24, 25, 26, 26a, 26b and 27, have the same meanings as disclosed in the above FIG. 4.

The present invention will be further illustrated below by means of a number of preparation examples, which are given for purely indicative purposes and without any limitation of this invention.

Example 1

Preparation of a Coated Bead Core

A coated bead core according to FIG. 3 was prepared as follows.

A bead core was obtained by spirally winding seven bare metal wires (each wire having a substantially hexagonal cross-section and being made of zinc plated HT steel material) to form seven axially adjacent stacks, each stack being formed of six radially superimposed coils. Subsequently, a first layer of a crosslinkable elastomeric material having a thickness of 1.0 mm (the components of said crosslinkable elastomeric material are given in Table 1—Example A) was loop-wise wrapped around the bead core obtaining a coated bead core. Then, a second layer of crosslinkable elastomeric material having a thickness of 0.65 mm (the components of said crosslinkable elastomeric material are given in Table 2—Example B) into which reinforcing cords of nylon are embedded, was applied by spirally winding said layer around the coated bead core obtained as disclosed above. The so obtained coated bead core was inserted into an autoclave and was subsequently subjected to a partial crosslinking, by heating at 144° C. for 20 min. After the partial crosslinking, a third layer of crosslinkable elastomeric material having a thickness of 0.65 mm (the components of said crosslinkable elastomeric material are given in Table 2—Example B) into which nylon reinforcing cords are embedded, was applied by spirally winding said layer around the partially crosslinked coated bead core.

The elastomeric compositions given in Table 1 were prepared as follows (the amounts of the various components are given in phr).

All the components, except sulfur, accelerator (TBBS), retardant (CTP) and hexamethoxymethylenemelamine (HMMM), were mixed together in an internal mixer (model Pomini PL 1.6) for about 5 minutes ($1^{st}$ Step). As soon as the temperature reached 145±5° C., the elastomeric material was discharged. The sulfur, accelerator (TBBS), retardant (CTP) and hexamethoxymethylenemelamine (HMMM), were then added and mixing was carried out in an open roll mixer ($2^{nd}$ Step).

TABLE 1

| INGREDIENTS | EXAMPLE A |
|---|---|
| $1^{st}$ STEP | |
| NR | 100 |
| Stearic acid | 1.0 |
| Zinc oxide | 10.0 |
| Rhenogran Resorcinol ® 80 | 20.0 |
| Wax | 1.0 |
| N375 | 75.0 |
| Aromatic oil | 4.0 |
| TMQ | 0.5 |
| 6-PPD | 1.0 |
| Manobond ® 680C | 3.0 |
| $2^{nd}$ STEP | |
| 33% insoluble sulfur | 10.5 |
| CTP | 0.5 |

TABLE 1-continued

| INGREDIENTS | EXAMPLE A |
|---|---|
| HMMM | 5.0 |
| TBBS | 1.0 |

NR: natural rubber;
Rhenogran Resorcinol ® 80: 80% resorcinol supported with a polymeric excipient (Rhein-Chemie);
N375: carbon black;
TMQ (antioxidant): polymerized 2,2,4-trimethyl-1,2-dihydroquinoline (Vulcanox ® 4020 - Lanxess);
6-PPD (antioxidant): para-phenylenediamine (Santoflex ® 13 - Monsanto);
Manobond ® 680C: complex based on boron and cobalt (OMG group);
33% insoluble sulfur: Crystex ® OT33 (Flexsys);
CTP (retardant): cyclohexylthiophthalimide (Vulkalent ® G - Lanxess);
HMMM: hexamethoxymethylenemelamine (Cyrez ® 963 - Cytec);
TBBS (accelerator): N-t-butyl-2-benzothiazilsulphenamide (Vulkacit ® NZ - Lanxess).

TABLE 2

| INGREDIENTS | EXAMPLE B |
|---|---|
| 1$^{st}$ STEP | |
| NR | 100 |
| Stearic acid | 1.5 |
| Zinc oxide | 6.0 |
| Rhenogran Resorcinol ® 80 | 1.5 |
| Renacit ® 11 | 0.27 |
| N326 | 54.0 |
| Aromatic oil | 2.5 |
| 6-PPD | 1.0 |
| 2$^{nd}$ STEP | |
| 33% insoluble sulfur | 4.5 |
| CTP | 0.2 |
| HMMM | 2.9 |
| TBBS | 1.25 |

NR: natural rubber;
Rhenogran Resorcinol ® 80: 80% resorcinol supported with a polymeric excipient (Rhein-Chemie);
Renacit ® 11 (masticating agent): activated 2,2'-dibenzamido diphenyldisulphide (Lanxess);
N326: carbon black;
6-PPD: para-phenylenediamine (Santoflex ® 13 - Monsanto);
Manobond ® 680C: complex based on boron and cobalt (OMG group);
33% insoluble sulfur: Crystex ® OT33 (Flexsys);
CTP: cyclohexylthiophthalimide (Vulkalent ® G - Lanxess);
HMMM: hexamethoxymethylenemelamine (Cyrez ® 963 - Cytec);
TBBS: N-t-butyl-2-benzothiazilsulphenamide (Vulkacit ® NZ - Lanxess).

Example 2

Determination of the Properties of the Partially Crosslinked Layer of Elastomeric Material The properties of the partially crosslinked layer of elastomeric material coating a bead core according to the present invention were determined as follows.
a) Amount of Free Sulfur A coated bead core according to FIG. 3 obtained as disclosed in Example 1 was prepared. Subsequently, the second and third layers of elastomeric material into which nylon reinforcing cords are embedded, were peeled-off and a test specimen of the partially crosslinked first layer of elastomeric material was taken out.

The amount of free sulfur was determined as follows. The amount of combined sulfur in the above obtained test specimen was determined by means of the combustion in oxygen after extraction with acetone according to Standard ASTM D297-93(2002)$^{ε2}$.

The amount of the free sulfur was calculated as follows:

% by weight of free sulfur=$(S_T-S_C)\times 100$ wherein:
$S_T$ is the total amount of sulfur present in the crosslinkable elastomeric material;
$S_C$ is the amount of combined sulfur.

The amount of free sulfur was of 55% by weight.
b) Dynamic Elastic Modulus (E')

The dynamic elastic modulus (E') was measured using an Instron dynamic device in the traction-compression mode according to the following methods.

A sample of the crosslinkable elastomeric material given in Table 1 (Example A), having a cylindrical form (length=25 mm; diameter=12 mm), was subjected to a partial crosslinking, by heating at 144° C., for 20 min, in a laboratory mould. The obtained partially crosslinked sample was compression-preloaded up to a 10% longitudinal deformation with respect to the initial length, and kept at the prefixed temperature (100° C.) for the whole duration of the test, was submitted to a dynamic sinusoidal strain having an amplitude of ±3.5% with respect to the length under pre-load, with a 10 Hz frequency. The dynamic elastic modulus (E') was 22.9 MPa.
c) Dynamic Shear Elastic Modulus (G')

The dynamic shear elastic modulus (G') was measured using a Monsanto R.P.A. 2000 rheometer.

For this purpose, a cylindrical test specimen (4.5 g) was obtained from the crosslinkable elastomeric material given in Table 1 (Example A), then was introduced into a Monsanto R.P.A. 2000 rheometer mould and was subsequently subjected to a partial crosslinking, by heating at 144° C., for 20 min.

The obtained partially crosslinked test specimen was subjected to the measurement of (G') at 70° C., frequency 10 Hz, deformation 9%. The dynamic shear elastic modulus (G') was 9 MPa.

Example 3

Two typologies of tyres (tyre A and tyre B), having size 315/80 R22.5, were manufactured.

Tyres A and B had identical structural elements, i.e. identical carcass (one carcass ply), two crossed belt plies, two lateral reinforcing strips (zero-degree reinforcing strips, positioned radially external to the crossed belt plies and formed of two radially superimposed layers, as shown in FIG. 4, a breaker layer (which is radially superimposed on the radially external belt layer and interposed between the lateral reinforcing strips), identical tread band.

Tyre A comprises a bead structure obtained according to Example 1 wherein, after the partial crosslinking step, the amount of free sulfur was of 55% by weight.

Tyre B (comparative) comprises a bead structure similar to the bead structure of tyre A, the only difference being that after the partial crosslinking step, the amount of free sulfur was of 85% by weight.

Indoor testings were carried out on three tyres A and three tyres B so that an average value of the tests results could be calculated.
a) Tyre Bead Fatigue Stress Test The tyres were mounted on a 9.00" wheel rim and inflated at a pressure of 135 psi (9.5 bar). The tyres were subjected to a load of 9,220 kgf, i.e. to an overload of 240% with respect to the tyre load capacity. Successively the tyres were rotated on a road wheel at a fixed and controlled speed of 20 km/h. The test was stopped when the tyres came to a failure and the time, at which the tyre failure occurred, was detected.

The results were given in Table 3 from which it may be pointed out that the fatigue stress is incremented of about 14% for the tyre A of the present invention with respect to the comparative tyre B. Such a result shows that the tyre of the present invention provides a better geometrical stability and an increased bead integrity during use in comparison with conventional tyres.

TABLE 3

|  | sample 1 (h) | sample 2 (h) | sample 3 (h) | Average value (h) |
|---|---|---|---|---|
| TYRE A (invention) | 307 | 336 | 329 | 324 |
| TYRE B (comparative) | 265 | 302 | 285 | 284 | b) Tyre Burst Test

The tyres, loaded with the nominal operating load and mounted on the respective wheel rim, were progressively inflated with water. The test was stopped when the tyre burst or when the tyre bead slipped off the rim and the time at which said phenomena occurred, was detected.

The results were given in Table 4 from which it may be pointed out that tyre burst is incremented of about 10% for the tyre A of the present invention with respect to the comparative tyre B. Such a result shows that the compactness cc well as the resistance to local deformations of the bead core of the tyre of the present invention is increased with respect to those of conventional tyres.

TABLE 4

|  | sample 1 (bar) | sample 2 (bar) | sample 3 (bar) | Average value (bar) |
|---|---|---|---|---|
| TYRE A (invention) | 31 | 28 | 27 | 28.6 |
| TYRE B (comparative) | 27 | 26 | 25 | 26.0 |

The invention claimed is:

1. A process for forming a bead structure used in manufacturing a tyre comprising:
   (a) winding at least one bare metal wire or cord so as to form a plurality of coils, said coils being radially superimposed and axially arranged side-by-side with respect to one another, to obtain a bead core;
   (b) applying a layer of crosslinkable elastomeric material to the bead core obtained in step (a), to obtain a coated bead core wherein the layer of the crosslinkable material comprises: at least one elastomeric polymer; at least one rubber-to-metal adhesion promoting additive present in an amount ranging from 0.2 phr to 3 phr; and sulfur or derivatives thereof present in an amount ranging from 6 phr to 12 phr;
   (c) partially crosslinking said layer of crosslinkable elastomeric material at a temperature ranging from 125° C. to 150° C. and for a period of time ranging from 10 minutes to 40 minutes, to obtain 50% by weight to 60% by weight free sulfur with respect to the total weight of the sulfur present in said crosslinkable elastomeric material; and
   (d) applying a bead filler to the radial outer surface of the bead core obtained in step (c), to obtain a bead structure.

2. The process according to claim 1, wherein after said partially crosslinking step (c) is carried out, a sample of said layer of crosslinkable elastomeric material in cylindrical form with a length of 25 mm and a diameter of 12 mm has a dynamic elastic modulus, measured at 100° C., lower than or equal to 28 MPa at a frequency of 10 Hz with a deformation of 10% and a dynamic sinusoidal strain having an amplitude of ±3.5% with respect to the length.

3. The process according to claim 1, wherein after said partially crosslinking step (c) is carried out, a sample of said layer of crosslinkable elastomeric material in a cylindircal form of 4.5 g has a dynamic shear elastic modulus, measured at 70° C., at a frequency of 10 Hz, with a deformation of 9% lower than or equal to 15 MPa.

4. The process according to claim 1, wherein step (a) is carried out by winding a plurality of metal wires or cords, each individual metal wire or cord being radially coiled onto itself so as to form a stack of radially superimposed wound coils.

5. The process according to claim 1, wherein the at least one metal wire or cord is made of steel.

6. The process according to claim 1, wherein step (b) of applying a layer of crosslinkable elastomeric material to the bead core obtained in step (a), is carried out by loop-wise wrapping around the bead core obtained in step (a) said layer of crosslinkable elastomeric material.

7. The process according to claim 1, wherein step (b) of applying said layer of crosslinkable elastomeric material to the bead core obtained in step (a), is carried out by helically winding said at least one layer of crosslinkable elastomeric material around the bead core.

8. The process according to claim 1, wherein said layer of crosslinkable elastomeric material has a thickness of 0.2 mm to 2 mm.

9. The process according to claim 8, wherein said layer of crosslinkable elastomeric material has a thickness of 0.5 mm to 1.5 mm.

10. The process according to claim 1, wherein said partially crosslinking step (c) is carried out for 15 min to 25 min.

11. The process according to claim 1, wherein said process further comprises step ($b_1$) of applying a one or more additional layers of crosslinkable elastomeric material into which reinforcing cords of heat-shrinkable material are embedded, around the coated bead core obtained in step (b).

12. The process according to claim 11, wherein said reinforcing cords of heat-shrinkable material are made of thermoplastic polymers, nylon, polyethyleneterephthalate, or polyethylene-naphthalate.

13. The process according to claim 1, wherein said process further comprises step ($c_2$) of surface-treating the coated bead core obtained in step (c).

14. The process according to claim 13, wherein step ($c_2$) is carried out by dipping the coated bead core obtained in step (c) into an elastomeric solution.

* * * * *

UNITED STATES PATENT AND TRADEMARK OFFICE
CERTIFICATE OF CORRECTION

| | | |
|---|---|---|
| PATENT NO. | : 10,766,218 B2 | Page 1 of 1 |
| APPLICATION NO. | : 14/020282 | |
| DATED | : September 8, 2020 | |
| INVENTOR(S) | : Giuseppe Cereda et al. | |

It is certified that error appears in the above-identified patent and that said Letters Patent is hereby corrected as shown below:

On the Title Page

Item (54) and in the Specification, Column 1, Line 1-2, "PROCESS FOR MANUFACTURING A TYPE AND TYRE BEAD STRUCTURE" should read -- PROCESS FOR MANUFACTURING A TYRE AND TYRE BEAD STRUCTURE --.

Signed and Sealed this
Sixth Day of September, 2022

Katherine Kelly Vidal
*Director of the United States Patent and Trademark Office*